United States Patent
Rao (10) Patent No.: US 7,694,293 B2
(45) Date of Patent: Apr. 6, 2010

(54) UPDATE PACKAGE CATALOG FOR UPDATE PACKAGE TRANSFER BETWEEN GENERATOR AND CONTENT SERVER IN A NETWORK

(75) Inventor: Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 860 days.

(21) Appl. No.: 10/950,764

(22) Filed: Sep. 27, 2004

(65) Prior Publication Data

US 2005/0071385 A1  Mar. 31, 2005

Related U.S. Application Data (60) Provisional application No. 60/513,848, filed on Oct. 22, 2003, provisional application No. 60/506,294, filed on Sep. 26, 2003.

(51) Int. Cl.
*G06F 9/44* (2006.01)
*G06F 9/445* (2006.01)
*G06F 11/30* (2006.01)

(52) U.S. Cl. .............. 717/172; 717/169; 717/170; 717/176; 713/191

(58) Field of Classification Search .............. None
See application file for complete search history.

(56) References Cited

U.S. PATENT DOCUMENTS

| 5,261,055 | A | 11/1993 | Moran et al. | 395/275 |
|---|---|---|---|---|
| 5,442,771 | A | 8/1995 | Filepp et al. | 395/650 |
| 5,479,637 | A | 12/1995 | Lisimaque et al. | 395/430 |
| 5,579,522 | A | 11/1996 | Christeson et al. | 395/652 |
| 5,596,738 | A | 1/1997 | Pope | 395/430 |
| 5,598,534 | A | 1/1997 | Haas | 395/200.09 |
| 5,608,910 | A | 3/1997 | Shimakura | 395/670 |
| 5,623,604 | A | 4/1997 | Russell et al. | 395/200.1 |
| 5,666,293 | A | 9/1997 | Metz et al. | 395/200.5 |
| 5,752,039 | A | 5/1998 | Tanimura | 395/712 |
| 5,778,440 | A | 7/1998 | Yiu et al. | 711/154 |
| 5,790,974 | A | 8/1998 | Tognazzini | 701/204 |
| 5,878,256 | A | 3/1999 | Bealkowski et al. | 395/652 |

(Continued)

FOREIGN PATENT DOCUMENTS

CA  2339923  3/2000

(Continued)

OTHER PUBLICATIONS

W3C, XML-Signature Syntax and Processing, http://www.w3.org/TR/xmldsig-core/, 1 page.*

(Continued)

*Primary Examiner*—Tuan Q Dam
*Assistant Examiner*—Thuy Dao (57) ABSTRACT

A network wherein a generator is communicatively coupled to an update store or repository employs an update package container or catalog (UPC) that may be used to save information, using an XML format. The UPC may comprise update packages for one or more devices, and one or more transitions of versions for each device. The UPC may also comprise metadata information and security information associated with each the update packages. The complete update packages and associated metadata may be incorporated into an UPC, or external references to the update packages may be provided.

24 Claims, 4 Drawing Sheets

U.S. PATENT DOCUMENTS

| | | | | |
|---|---|---|---|---|
| 5,960,445 | A | 9/1999 | Tamori et al. | 707/203 |
| 6,009,497 | A | 12/1999 | Wells et al. | 711/103 |
| 6,038,636 | A | 3/2000 | Brown, III et al. | 711/103 |
| 6,064,814 | A | 5/2000 | Capriles et al. | 395/701 |
| 6,073,206 | A | 6/2000 | Piwonka et al. | 711/102 |
| 6,073,214 | A | 6/2000 | Fawcett | 711/133 |
| 6,088,759 | A | 7/2000 | Hasbun et al. | 711/103 |
| 6,105,063 | A | 8/2000 | Hayes, Jr. | 709/223 |
| 6,112,024 | A | 8/2000 | Almond et al. | 395/703 |
| 6,112,197 | A | 8/2000 | Chatterjee et al. | 707/3 |
| 6,126,327 | A | 10/2000 | Bi et al. | 395/200.51 |
| 6,128,695 | A | 10/2000 | Estakhri et al. | 711/103 |
| 6,157,559 | A | 12/2000 | Yoo | 365/52 |
| 6,163,274 | A | 12/2000 | Lindgren | 340/825.44 |
| 6,198,946 | B1 | 3/2001 | Shin et al. | 455/561 |
| 6,279,153 | B1 | 8/2001 | Bi et al. | 717/11 |
| 6,311,322 | B1 | 10/2001 | Ikeda et al. | 717/1 |
| 6,438,585 | B2 | 8/2002 | Mousseau et al. | 709/206 |
| 6,651,249 | B2 * | 11/2003 | Waldin et al. | 717/170 |
| 6,832,373 | B2 * | 12/2004 | O'Neill | 717/171 |
| 2001/0029178 | A1 | 10/2001 | Criss et al. | 455/419 |
| 2001/0047363 | A1 | 11/2001 | Peng | 707/104.1 |
| 2001/0048728 | A1 | 12/2001 | Peng | 375/354 |
| 2002/0078209 | A1 | 6/2002 | Peng | 709/227 |
| 2002/0116261 | A1 | 8/2002 | Moskowitz et al. | 705/14 |
| 2002/0131404 | A1 | 9/2002 | Mehta et al. | 370/352 |
| 2002/0152005 | A1 | 10/2002 | Bagnordi | 700/234 |
| 2002/0156863 | A1 | 10/2002 | Peng | 709/217 |
| 2002/0157090 | A1 | 10/2002 | Anton, Jr. | 717/178 |
| 2002/0174338 | A1 * | 11/2002 | Tomita et al. | 713/176 |
| 2003/0033599 | A1 | 2/2003 | Rajaram et al. | 717/173 |
| 2003/0037075 | A1 | 2/2003 | Hannigan et al. | 707/500 |
| 2003/0041125 | A1 | 2/2003 | Salomon | |
| 2003/0061384 | A1 | 3/2003 | Nakatani | 709/245 |
| 2003/0163551 | A1 | 8/2003 | Riordan | |
| 2004/0003266 | A1 * | 1/2004 | Moshir et al. | 713/191 |

FOREIGN PATENT DOCUMENTS

| | | |
|---|---|---|
| JP | 8202626 | 8/1996 |
| KR | 2002-0034228 | 5/2000 |
| KR | 2001-0100328 | 11/2001 |
| WO | WO-02/25438 A1 | 3/2002 |
| WO | WO-02/41147 A1 | 5/2002 |

OTHER PUBLICATIONS

"Schema-guided wrapper maintenance for web-data extraction", Meng et al., Nov. 2003, pp. 1-8. <http://delivery.acm.org/10.1145/960000/956701/p1-meng.pdf>.*

"A software package for sparse orthogonal factorization and updating", O. Edlund, Dec. 2002, pp. 448-482, <http://delivery.acm.org/10.1145/600000/592848/p448-edlund.pdf>.*

"Software update via mobile agent based programming", Bettini et al., Mar. 2002, pp. 32-36, <http://delivery.acm.org/10.1145/510000/508800/p32-bettini.pdf>.*

"An optimal location update and searching algorithm for tracking mobile agent", Li et al., Jul. 2002, pp. 639-646, <http://delivery.acm.org/10.1145/550000/544892/p639-li.pdf>.*

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

UPDATE PACKAGE CATALOG FOR UPDATE PACKAGE TRANSFER BETWEEN GENERATOR AND CONTENT SERVER IN A NETWORK

RELATED APPLICATIONS

This patent application makes reference to, claims priority to, and claims benefit from U.S. Provisional Patent Application Ser. No. 60/506,294, entitled "Update Package Catalog for Update Package Transfer Between Generator and Content Server in Network," filed on Sep. 26, 2003, and claims priority to and claims benefit from U.S. Provisional Patent Application Ser. No. 60/513,848, entitled "Update Package Container", filed Oct. 22, 2003.

The complete subject matter of the above-referenced United States Provisional Patent Applications are hereby incorporated herein by reference, in their entirety. In addition, this application makes reference to U.S. Provisional Patent Application Ser. No. 60/249,606, entitled "System and Method for Updating and Distributing Information", filed Nov. 17, 2000, and International Patent Application Publication No. WO 02/41147 A1, entitled "System and Method for Updating and Distributing Information," publication date Mar. 23, 2002, the complete subject matter of each of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. These firmware and application software often contain software bugs. New versions of the firmware and software are periodically released to fix the bugs or to introduce new features, or both.

A generator in a manufacturing environment of an electronic device such as a mobile handset, or in other software development environments, generates update packages that are used to update the firmware of software components. These update packages are deposited into a repository. Unfortunately, several different generators may be generating different kinds of information. There is no easy way to populate these different kinds of update packages into a repository of some kind. More importantly, a repository within a distribution environment that can disseminate these update packages will have to deal with all the different formats in which the update packages are made available. In addition, other related information, such as metadata, that is often associated with update packages may be necessary for making decisions on the dissemination of update packages. However, such related information is often unavailable to the distribution environments. Special software is often written to retrieve such related information when necessary, from remote sources.

A telecom carrier or a wireless carrier may have a desire to support storing update packages received from several different sources, each source potentially employing various different formats for data to be transferred to the carrier network/wireless network. Providing security for such transfer of update packages from various sources is a problem. Supporting the plethora of security solutions is a management problem as well as a technical problem.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in an update package container for communicating updating information for a plurality of electronic devices. The update package container may comprise at least one device portion associated with a subset of the plurality of electronic devices, and each of the at least one device portion may comprise at least one target portion associated with a code in each electronic device in the subset of the plurality of electronic devices. In an representative embodiment of the present invention, each of the at least one target portion may comprise at least one transition portion associated with the conversion of the code from a first version to a second version, and each of the at least one transition portion may comprise one of an update package and reference information identifying the location of an update package outside of the update package container, and associated metadata. Each of the plurality of electronic devices may be identified by device identification information, and the device identification information may comprise at least one of a manufacturer identifier, a model identifier, and a version identifier. The associated metadata may comprise at least one of a size, a description, a creation date, a download time, a re-flash time, vendor information, and a digital signature of an update package.

A representative embodiment of the present invention may also comprise a digital signature of the at least one device portion of the update package container. The reference information identifying the location of an update package outside of the update package container may comprise a universal resource locator (URL). The set of all update packages contained within the update package container and the update packages referenced by the update package container may comprise difference information generated by a plurality of manufacturers and software vendors. In a representative embodiment of the present invention, an update package may comprise at least one of software, firmware, a java virtual machine, a game engine, a configuration file, and a system file one of the plurality of electronic devices. In another representative embodiment of the present invention, an update package may comprise difference information for updating a first version of code to a second version of code. The difference information may comprise a set of executable instructions for converting the first version of code to the second version of code.

Additional aspects of the present invention may be found in a network for distributing update packages to a plurality of electronic devices. Such a network may comprise an update package repository that stores a plurality of update packages for each of the plurality of electronic devices. The network may receive a plurality of update package containers containing update packages and associated metadata from each of a plurality of update package container sources to which the network is communicatively coupled, and the network may store update packages and associated metadata contained in the plurality of update package containers in the update package repository. In a representative embodiment of the present invention, at least one of the plurality of update package container sources may comprise a generator of update packages. The plurality of update package container sources may comprise a plurality of generators, each of the plurality of generators having an associated data type definition and managed by an associated one of a plurality of manufacturers of the plurality of electronic devices. The plurality of generators may employ the same data type definition.

The network in a representative embodiment of the present invention may comprise a wireless network and at least a portion of the plurality of update package container sources may be located remote from the update package repository. The update package repository may receive update package containers from the plurality of update package container sources and may verify authenticity of update package containers before further processing of update package containers. In a representative embodiment of the present invention, the update package repository may receive update package containers from the plurality of update package container sources and may verify authenticity of update package containers and update packages contained therein before disseminating the update packages. An update package may comprise difference information for updating a first version of code to a second version of code, and the difference information may comprise a set of executable instructions for converting the first version of code to the second version of code.

Yet additional aspects of the present invention may be observed in a method of communicating a plurality of update packages from a generator to a repository using an update package container, where each of the plurality of update packages may be associated with an electronic device. Such a method may comprise generating the plurality of update packages, digitally signing the plurality of update packages, and gathering metadata associated with the plurality of update packages. The metadata may comprise digital signatures for the plurality of update packages. A representative embodiment of the present invention may also comprise inserting the plurality of update packages and associated metadata into the update package container, signing the update package container using digital signing techniques, and delivering the digitally signed update package container to the repository. In a representative embodiment of the present invention, inserting may comprise arranging the plurality of update packages according to at least one of a manufacturer type, a model, a target, and a transition of the associated electronic device. Signing the update package container may comprise computing a World Wide Web Consortium (W3)-based digital signature, and inserting the W3C-based digital signature into the update package container. Inserting may comprise incorporating update packages generated for at least one of a firmware, a software, a configuration, and a data. In addition, delivering may comprise establishing secure communication between the generator and the repository, and depositing the update package container in the repository for processing and storage.

These and other advantages, aspects, and novel features of the present invention, as well as details of illustrated embodiments, thereof, will be more fully understood from the following description and drawings.

DETAILED DESCRIPTION OF THE INVENTION

The present invention relates generally to secure transfer of update packages from various generation environments, where update packages are generated for software or firmware updates employing various difference information generators, to an operator's network or a secure distribution network. Various original equipment manufacturers (OEMs) and third party software vendors are typically responsible for generating updates of firmware/software components in electronic devices such as, for example, mobile handsets using an update agent. The OEMs and third party software vendors desire to communicate updates securely to an operator's network or to a distribution environment. Although the following material discusses aspects of the invention in terms of update package containers for firmware and software for mobile handsets, it should be clear that the following also applies to other types of information, and also to other mobile electronic devices such as, for example, personal digital assistants (PDAs), pagers, personal computers (PCs), and similar handheld electronic devices.

Figure 1:
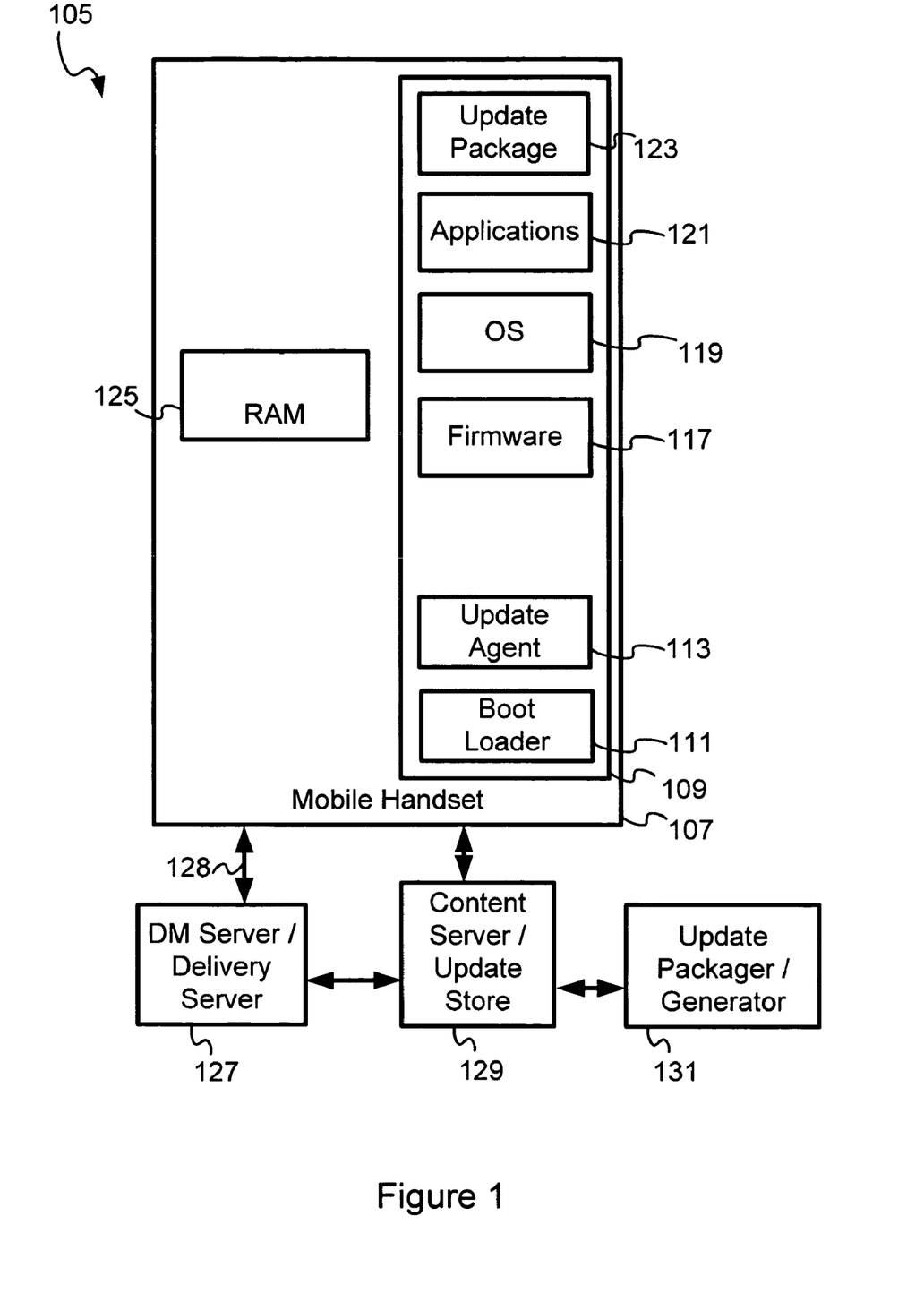
FIG. 1 illustrates a block diagram of an exemplary mobile handset that is used in a network capable of downloading update packages in an update package container (UPC) format, in accordance with a representative embodiment of the present invention.

FIG. 1 illustrates a block diagram of an exemplary mobile handset 107 that is used in a network 105 capable of downloading update packages in an update package container (UPC) format, in accordance with a representative embodiment of the present invention. The network 105 may comprise, for example, a wired or wireless carrier network, and may download update packages employing over-the-air (OTA) or other techniques to electronic devices such as, for example, the mobile handset 107. The mobile handset 107 may update its firmware 117 and software 119, 121, using the update packages generated by an update packager/generator 131. The update packages may comprise, for example, a set of executable instructions for converting a first version of firmware/software to a second version of firmware/software. The update packages may be transferred to a content server/update store 129 that is communicatively coupled to the mobile handset 129, either directly or via a DM server/delivery server 127, employing an update package container (UPC) format. The UPC format may also sometimes be referred to as an update package catalog format.

In a representative embodiment of the present invention, the update packager/generator 131 may generate or create one or more update packages, determine and/or gather associated metadata, determine or compute security information such as digital signatures, and may incorporate or assemble the update packages, metadata, and security information into an update package catalog. In a representative embodiment of the present invention, an update package container may comprise an area of memory having an arrangement of information items as described herein. In another representative embodiment according to the present invention, an update package container may comprise a message containing information items as described herein. The update package catalog (i.e., update package container) may then be communicated to the content server/update store 129 that serves as a repository for the network 105. The content server/update store 129 may be capable of parsing the update package catalog, and may selectively retrieve all or a subset of the available update packages. The content server/update store 129 may selectively verifying the authenticity of the update package catalog as well as that of the update packages themselves, and may save information in storage. The content server/update store 129 in a representative embodiment of the present invention may behave as a repository of update packages and associated metadata.

Update packages from one or more manufacturers with update packager/generators 131 may, for example, be sent to the content server/update store 129 for storage and subsequent dissemination to mobile handsets 107, via the device management (DM) Server/Delivery server 127.

In one representative embodiment of the present invention, the update package catalog (UPC) (i.e., update package container) may be used to save information, using an extensible markup language (XML) format. Such information may comprise update packages for one or more devices and one or more transitions of versions for each device. In addition, support for one or more targets in each device may also be provided, the targets being all firmware, some subset of firmware, a single software component, multiple application components, etc. Other more efficient formats such as, for example, wireless binary extensible markup language (WBXML) and binary formats are also contemplated for the UPC.

In a representative embodiment of the present invention, the network 105 may comprise a generator that is communicatively coupled to, for example, an update store or some other form of repository. The generator, for example, the packager/generators 131 shown in FIG. 1, may employ an update package container (UPC) to save information, using an XML format. The UPC may comprise one or more update packages for one or more devices, and one or more transitions of versions for each device. The UPC may be created by the update packager/generators 131 and may be transferred to a repository such as, for example, the content server/update store 129. As described above, the UPC may also comprise metadata information, security information, etc.

In one representative embodiment of the present invention, the UPC may contain update packages such as, for example, the update packages described above. In another representative embodiment according to the present invention, the UPC may contain references to update packages. In yet another representative embodiment of the present invention, the UPC may contain a combination of update packages and references to update packages. In addition, a UPC in a representative embodiment of the present invention may contain authentication and authorization information used by a consumer such as, for example, a carrier network to retrieve the update packages at a later time.

Update packages, whether generated by manufacturers, by carriers, or by other sources, may encapsulate changes between two different versions of firmware for an electronic device. Update packages are a form of deliverable content that may be disseminated, via a distribution network (e.g., a carrier network), to mobile handsets such as, for example, the mobile handset 107 of FIG. 1. Each update package may comprise a set of executable instructions for converting a first version of code in an electronic device to a second, updated version of code. It may be desirable to collect update packages in a repository before they are disseminated. Various representative embodiments of the present invention address the standardization of the packaging of update packages into update package containers, so as to enable the transfer of update packages from a plurality of sources into a distribution environment, employing a standardized format.

A representative embodiment of the present invention may comprise an XML wrapper for an update package by means of an update package container (UPC), and metadata for an update package that is incorporated into the UPC. A representative embodiment according to the present invention may also comprise digital signature information (or other forms of signatures) for authentication, and support for simultaneous publishing of a plurality of update packages. A representative embodiment of the present invention may also include information useful for informing the end-user of an approximate download and re-flash time. Such information may be provided, for example, as part of the metadata for an individual update package.

In a representative embodiment of the present invention, the structure of individual update packages may be proprietary, and the UPC may support several different types of update packages from different vendors. In addition, the UPC may be orthogonal to the communication mechanism employed to transfer it from a generator such as, for example, the update packager/generators 131 of FIG. 1, to a repository or delivery server such as, for example, the content server/update store 129 of FIG. 1. A representative embodiment in accordance with the present invention supports an arrangement where the update package container (UPC) comprises references to the actual data (such as, for example, a universal resource locator (URL)) rather than the data itself. For example, URLs to update packages may be provided in a UPC in place of the referenced update packages.

In a representative embodiment of the present invention, the generation of an update package may be conducted in a generation environment such as, for example, the update packager/generators 131 of FIG. 1. Such a generation environment may be managed by, for example, a manufacturer, and may be separate and different from a distribution environment that may be managed by, for example, a carrier.

A representative embodiment of the present invention provides for the collection of update packages from a variety of sources in order to make them available (e.g., using a repository) for dissemination (using a distribution environment). A representative embodiment of the present invention supports more than one source of update packages such as, for example, multiple different manufacturers and/or carriers in need of a way to deposit their generated update packages in a repository associated with the distribution environment (such as a carrier network). Although not all sources of update packages may employ the same transfer mechanisms, a representative embodiment of the present invention permits them to adopt the same XML wrappers and metadata supported by the UPC for the update packages that are deposited into a repository associated with the distribution environment. In addition, a representative embodiment of the present invention provides a structure for efficient grouping of update packages, associated metadata and other related data, that would otherwise be scattered across several data sources requiring multiple queries or communications to assemble or retrieve.

Figure 2:
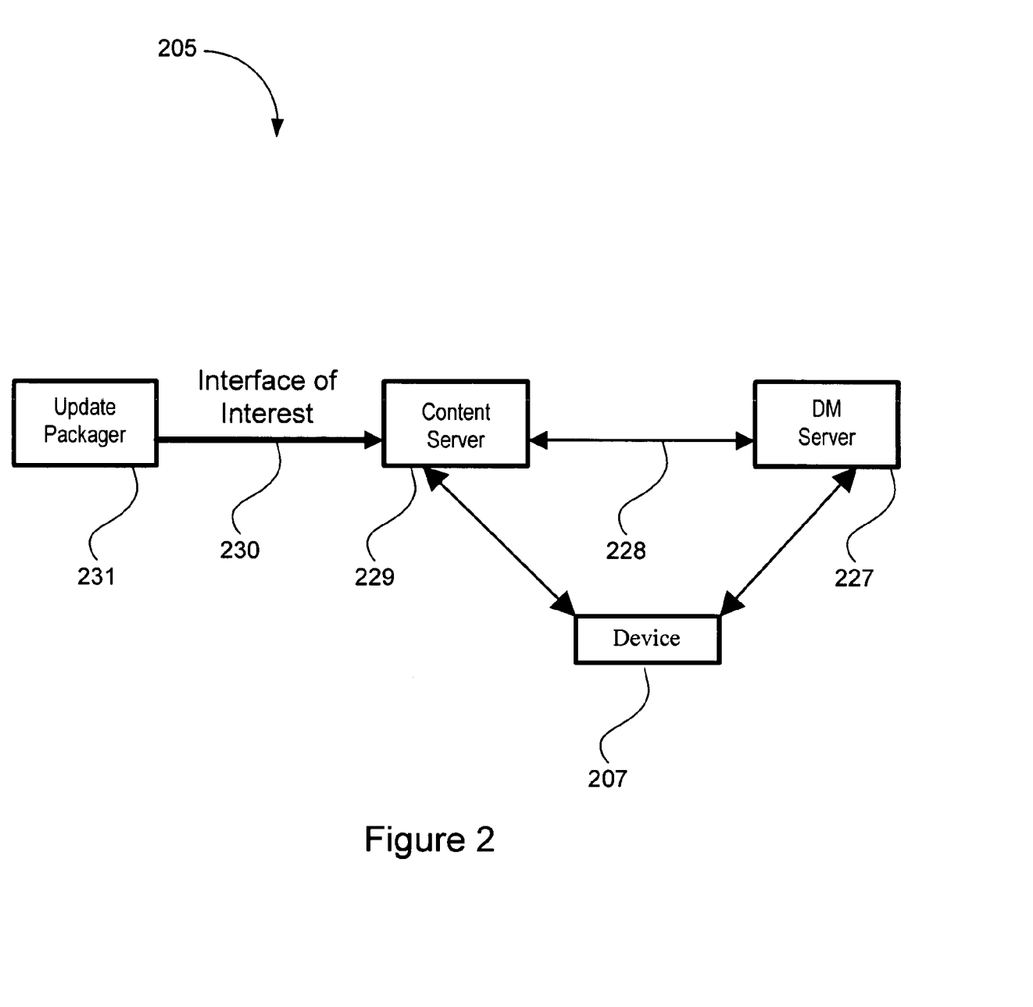
FIG. 2 is a block diagram illustrating an exemplary embodiment of an UPC system that comprises a content server capable of supporting download of content such as, for example, firmware update packages, in accordance with a representative embodiment of the present invention.

FIG. 2 is a block diagram illustrating an exemplary embodiment of an UPC system 205 that comprises a content server 229 capable of supporting download of content such as, for example, firmware update packages, in accordance with a representative embodiment of the present invention. The UPC system 205 of FIG. 2 also comprises an update packager 231 that may correspond, for example, to the update packager/generator 131 of FIG. 1. The update packager 231 may be capable of generating update packages and transferring them, via communication link 230, to the content server 229, in the form of update package catalogs/update package containers (UPCs). The content server 229 may correspond, for example, to the content server/update store 129 of FIG. 1, and may be communicatively coupled to a device management (DM) server 227. The device management (DM) server 227 may correspond to, for example, the DM server/delivery server 127 of FIG. 1. The device management (DM) server 227 may be capable of managing devices such as, for example, the device 207. The device 207 of FIG. 2 may correspond, for example, to the mobile handset 107 of FIG. 1, and may be configured so as to be capable of being managed by the DM server.

The content server 229 may comprise a repository to store and retrieve update packages. The content server 229 may facilitate the delivery of update packages to mobile handsets such as, for example, the mobile handset 107 of FIG. 1. A representative embodiment according to the present invention may be suitably adapted to support the interactions between the update packager 231 and the content server 229.

Figure 3:
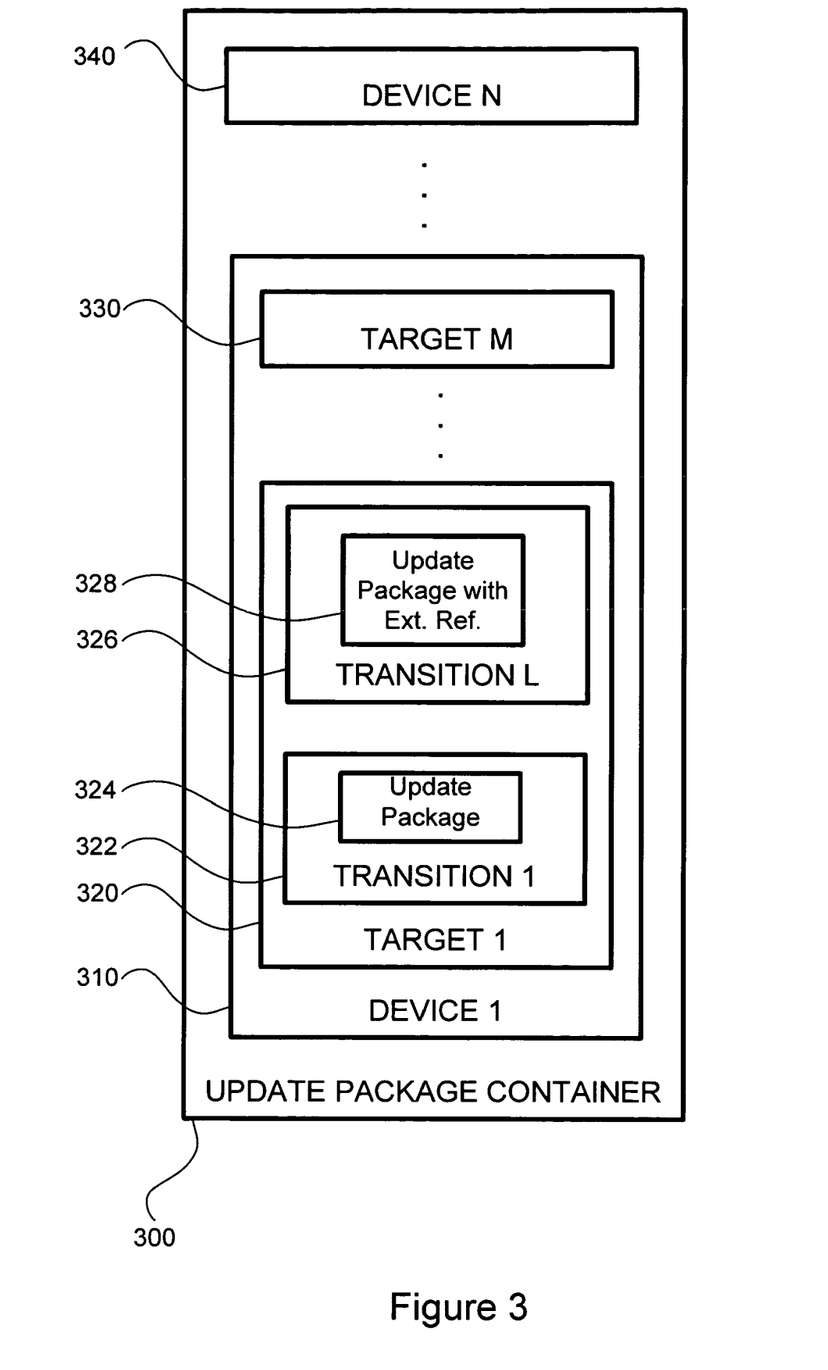
FIG. 3 is a perspective block diagram of an exemplary update package container (UPC), in accordance with a representative embodiment of the present invention.

FIG. 3 is a perspective block diagram of an exemplary update package container (UPC) 300, in accordance with a representative embodiment of the present invention. As shown in the illustration of FIG. 3, the UPC 300 comprises several blocks/segments of device information for device 1 310 through device N 340. Each block/segment of device information 310, 340 may comprise one or more targets, such as, for example, the targets target 1 320 through target M 330 shown in FIG. 3. Each of the targets in the UPC 300 may comprise one or more transitions such as transition 1 322 through transition L 326 of target 1 320. In a representative embodiment of the present invention, a transition such as, for example, transition 1 320 through transition L 326 may comprise an update package such as, for example, the update package 324 of transition 1 322. A transition may also comprise an update package with an external reference such as, for example, the update package with external reference 328 of transition L 326. As shown in FIG. 3, each transition may comprise an update package and associated metadata (not shown).

In a representative embodiment of the present invention, an instance of an update package container (UPC) such as, for example, the UPC 300 of FIG. 3 may be created by a generator such as, for example, the update packager/generator 131 of FIG. 1. As illustrated in FIG. 3, the update package container (UPC) 300 may comprise one or more individual update packages 324, 328 associated with different possible (currently supported) firmware version transitions 322, 326, respectively. An originator of update packages such as, for example, a manufacturer, may desire to incorporate update packages for several different models of devices such as, for example, the device 207 of FIG. 2 into the same update package container 300. A representative embodiment of the present invention supports such packaging, in that a UPC is flexible enough to incorporate a hierarchy of content, based, for example, on manufacturer, model, and firmware version of the devices.

In a representative embodiment of the present invention, an update package container (UPC) system such as, for example, the UPC system 205 of FIG. 2 may employ an update package container that comprises the following capabilities:

a) the ability to incorporate a plurality of update packages
b) the ability to incorporate a plurality of manufacturer/model combinations
c) the ability to incorporate a plurality of version transitions for a given manufacturer/model
d) an efficient and compact format so as to minimize load on distribution network infrastructure that is part of the UPC system.
e) the ability to provide for security of update package download when the update package container comprises only a reference to the update packages and to associated metadata, and not the actual data (i.e. the update packages).

In a representative embodiment of the present invention, an update package container such as, for example, the UPC 330 of FIG. 3 may comprise an XML wrapper that encapsulates/wraps a plurality of update packages. Although the details of the exact contents of a particular update package container comprising a plurality of update packages may be beyond the scope of the present application, any collection of update packages may be assembled into an update package container using a representative embodiment of the present invention as described herein.

The update package container, in one representative embodiment in accordance with the present invention, may comprise an XML wrapper that supports multiple entries or elements, each entry/element aimed at facilitating the incorporation of one update package or difference information package into the container.

In the following example of an update package container in accordance with a representative embodiment of the present invention such as, for example, the UPC 300 of FIG. 3, a device is identified by a combination of manufacturer and model values. In addition, for each device, multiple transition entities representing firmware transitions with associated update packages may be specified. An update package container in accordance with a representative embodiment of the present invention may provide data about multiple devices within the same update package container.

To provide for the specification of update packages for different types of TARGETS, such as firmware, operating systems, applications, etc., a TARGET element has been introduced. Thus, for each DEVICE element, one or more TARGET elements each with one or more TRANSITION elements (update packages) may be specified.

```
<UPDATEPACKAGECONTAINER>
<DESCRIPTION>                                    </DESCRIPTION>
<DEVICE>
            <DESCRIPTION>                        </DESCRIPTION>
            <MANUFACTURER> make 1 </MANUFACTURER >
            <MODEL> model 1 </MODEL>
            <TARGET name='firmware'>
            <TRANSITION>
```

-continued

```
                <ORIGINALVERSION> </ORIGINALVERSION>
                <UPDATEDVERSION>  </UPDATEDVERSION>
                <UPDATEPACKAGE> </UPDATEPACKAGE>
        </TRANSITION>
        <TRANSITION>
                <ORIGINALVERSION> </ORIGINALVERSION>
                <UPDATEDVERSION>  </UPDATEDVERSION>
                <UPDATEPACKAGE> </UPDATEPACKAGE>
        </TRANSITION>
</TARGET>
<TARGET name='os'>              </TARGET >
<TARGET name='email'>           </TARGET >
</DEVICE>
<DEVICE>                        </DEVICE>
<SIGNATURETYPE>                 </SIGNATURETYPE>
<SIGNATURE>                     </SIGNATURE>
</UPDATEPACKAGECONTAINER>
```

The UPDATEPACKAGECONTAINER metadata elements for the content (update packages) being wrapped in XML may include elements shown in Table 1, below:

TABLE 1

| | |
|---|---|
| DEVICE | A combination of MANUFACTURER and MODEL information that uniquely identifies a line of devices manufactured by a manufacturer, that may be updated from one firmware version to another |
| MANUFACTURER | The name of the manufacturer |
| MODEL | The name of the model |
| ORIGINAL VERSION | The version of the firmware for which this update package is appropriate |
| UPDATEDVERSION | The version to which this update package will help make a transition |
| TRANSITION | The element that encapsulates an update package corresponding to a specific transition from one firmware version to another |
| TARGET | The element that may be used to specify the type of updateable code - software, firmware, operating system, applications (such as email) etc. |

The UPDATEPACKAGE itself may comprise several metadata elements. For example, individual update packages may comprise several metadata elements such as, for example, the following:
Name
Description
Creation-date
Size
Signature type
Signature
Download time estimate
Re-flash time estimate
Data
Data type
Update Type
Severity.

The signature associated with an update package may be a digital signature, an MD5 checksum, a cyclic redundancy check (CRC), etc. The data may, for example, have a MIME-type associated with it, that may be specified using an appropriate DATATYPE element value.

In a representative embodiment of the present invention, the UPDATEPACKAGE metadata elements may be defined as shown in Table 2, below:

TABLE 2

| | |
|---|---|
| NAME | The name of the Update package |
| DESCRIPTION | A textual description of the Update package |
| CREATIONDATE | The date on which the Update package was created such as, for example, mm-dd-yyyy format |
| SIZE | The size of the update package in bytes |
| SIGNATURETYPE | The type of the signature, such as digital signature, MD5 checksum, CRC, etc. |
| SIGNATURE | The signature for the update package, which is a result of a computation such as a CRC, MD5 checksum or a digital signature. The signature may incorporate all data elements of an UPDATEPACKAGE |
| DOWNLOADTIME | Estimated time, in seconds, taken to download the update package |
| REFLASHTIME | Estimated time, in second, taken to re-flash the firmware |
| DATATYPE | Information regarding the data such as 64encoded, binary, an associated mime-type. etc. |
| DATA | The update package data |
| UPDATETYPE | The type associated with the update package data, such as a bug fix, a new feature release, etc. |
| SEVERITY | The associated severity of update package data, such as HIGH, LOW, etc. |

An exemplary UPDATEPACKAGE that may be used to specify the Update Package metadata and data in the same level of an XML structure is provided below. This example may provide for the incorporation of metadata and data at the same level of the XML structure for the UPDATEPACKAGE element.

```
<UPDATEPACKAGE>
    <NAME>              </NAME>
    <DESCRIPTION>       </DESCRIPTION>
    <CREATIONDATE>      </CREATIONDATE>
    <SIZE>              </SIZE>
    <DOWNLOADTIME>      </DOWNLOADTIME>
    <REFLASHTIME>       </REFLASHTIME>
    <DATATYPE>          </DATATYPE>
    <DATA>              </DATA>
    <UPDATETYPE>        </UPDATETYPE>
    <SEVERITY>          </SEVERITY>
    <SIGNATURETYPE>     </SIGNATURETYPE>
    <SIGNATURE>         </SIGNATURE>
</UPDATEPACKAGE>
```

A different exemplary Update Package wherein the metadata and data may be provided at different levels on the XML structure is shown below. This example may provide for the specification of metadata and data different levels of the XML structure for the UPDATEPACKAGE element, with the actual data occurring a level below that of the metadata, enclosed within a PACKAGE pair of tags.

```
<UPDATEPACKAGE>
    <NAME>                      </NAME>
    <DESCRIPTION>               </DESCRIPTION>
    <CREATIONDATE>              </CREATIONDATE>
    <SIZE>                      </SIZE>
    <DOWNLOADTIME>              </DOWNLOADTIME>
    <REFLASHTIME>               </REFLASHTIME>
    <DATATYPE>                  </DATATYPE>
    <PACKAGE>
        <DATA>                  </DATA>
    </PACKAGE>
    <UPDATETYPE>                </UPDATETYPE>
    <SEVERITY>                  </SEVERITY>
    <SIGNATURETYPE>             </SIGNATURETYPE>
    <SIGNATURE>                 </SIGNATURE>
</UPDATEPACKAGE>
```

In a representative embodiment of the present invention, an update package container such as, for example, the update package container (UPC) 300 of FIG. 3, may be specified with references to external update packages. The update package container may contain references to externally stored update packages while comprising their metadata. An example of such an external update package reference is shown as update package with external reference 328 in FIG. 3. The actual binary data may be stored at an external website or at an external server and no assumptions need be made in terms of the architecture of such a server or website, only that a valid external reference is provided. The metadata for the update packages may be provided in an update package container, along with associated security information, such as signatures and signature types.

The following example provides an XML structure that supports external references to update package data through the use of a REFERENCE element.

```
<UPDATEPACKAGE>
    <NAME>                      </NAME>
    <DESCRIPTION>               </DESCRIPTION>
    <CREATIONDATE>              </CREATIONDATE>
    <SIZE>                      </SIZE>
    <DOWNLOADTIME>              </DOWNLOADTIME>
    <REFLASHTIME>               </REFLASHTIME>
    <DATATYPE>                  </DATATYPE>
    <REFERENCE>URL of Update Package
    specified here</ REFERENCE>
    <UPDATETYPE>                </UPDATETYPE>
    <SEVERITY>                  </SEVERITY>
    <SIGNATURETYPE>             </SIGNATURETYPE>
    <SIGNATURE>                 </SIGNATURE>
</UPDATEPACKAGE>
```

The REFERENCE element may facilitate specification of external references to the actual data (binary or otherwise) that may be hosted at a website or provided by a server. Assumptions concerning the security of such an access to external update packages need not be made. A representative embodiment of the present invention may comprise security support for such external accesses.

In a representative embodiment of the present invention, additional security-related (for example, authentication and authorization-related) information may be included in the update package element (e.g., within the UPDATEPACKAGE tags). Such information may enhance the security of subsequent download of the update package data by a consumer such as, for example, a user of a DM server or a repository in a carrier network.

The REFERENCE element that encloses the external reference to an update package may also be provided with attributes (e.g., that may be specified with an XML ATTLIST-based specification in an associated document type definition (DTD)) that may be saved and used by the user in a carrier network while downloading the update package. Such a download may occur from a website or distribution network available within the generation environment or provided as a portal (e.g., possibly outside the carrier network). A vendor generating the update packages may put them up on a portal and the UPC provided by the vendor may have external references (e.g., URL, etc.) to the update packages on the portal.

In a representative embodiment of the present invention, both the self-contained update package container (i.e., one without external references) and a UPC with external references may be used to advantage, depending upon the situation. There are several advantages in generating a self-contained update package container that comprises metadata as well as actual data for the update packages, rather than just references to external data. For example, a vendor, or a generating environment, that generates update packages may provide for the deferred access to the update packages referenced in an update package container without a publishing or distribution environment such as, for example, a web site. Thus, in employing a representative embodiment of the present invention, small vendors need not invest in expensive web-site solutions. In addition, the consumer of the update package container such as, for example, a carrier network need not deal with the non-availability of update packages due to the websites or publishing systems being "down" or otherwise inaccessible. With respect to the important issue of security, additional security for the download of update packages may be provided by the vendor's website or generation environment.

The following is an exemplary DTD that may provide for recursive definition of a TRANSITION element. The TRANSITION element may be used to encapsulate an update package. An UPDATEPACKAGE may comprise a signature which may be, for example, a digital signature, a CRC, and MD5 checksum, etc. A DEVICE element may be used to encapsulate one or more TARGET elements, wherein one instance of TARGET may be 'firmware' and another instance may be 'os', etc.

```
<!DOCTYPE UPDATEPACKAGECONTAINER PUBLIC
[
<!-- ============================================================-->
<!-- THE UPDATEPACKAGECONTAINER STRUCTURE        -->
<!-- ============================================================-->
<!ELEMENT    UPDATEPACKAGECONTAINER (DESCRIPTION, DEVICE+,
SIGNATURETYPE, SIGNATURE) >
```

-continued

```
<!ELEMENT      DEVICE (DESCRIPTION, MANUFACTURER, MODEL,
TARGET+) >
<!ELEMENT      TARGET (TRANSITION+) >
<!ATTLIST      TARGET name CDATA #REQUIRED>
<!ELEMENT      MANUFACTURER (#PCDATA) >
<!ELEMENT      MODEL ((#PCDATA) >
<!ELEMENT      TRANSITION (ORIGINAL VERSION, UPDATEDVERSION,
UPDATEPACKAGE) >
<!ELEMENT      ORIGINALVERSION (#PCDATA) >
<!ELEMENT      UPDATEDVERSION (#PCDATA) >
<!ELEMENT      UPDATEPACKAGE (NAME, DESCRIPTION,
CREATIONDATE, SIZE, SIGNATURETYPE, SIGNATURE,
DOWNLOADTIME, REFLASHTIME,
DATATYPE, (DATA | PACKAGE | REFERENCE),
UPDATETYPE, SEVERITY) >
<!ELEMENT      PACKAGE (DATA) >
<!ELEMENT      REFERENCE (#CDATA)>
<!ELEMENT      NAME (#PCDATA) >
<!ELEMENT      DESCRIPTION (#CDATA)>
<!ELEMENT      CREATIONDATE (#PCDATA) >
<!ELEMENT      SIZE (#PCDATA)>
<!ELEMENT      SIGNATURETYPE (#PCDATA)>
<!ELEMENT      SIGNATURE (#PCDATA)>
<!ELEMENT      DOWNLOADTIME (#PCDATA)>
<!ELEMENT      REFLASHTIME (#PCDATA)>
<!ELEMENT      DATATYPE (#PCDATA)>
<!ELEMENT      DATA (#PCDATA)>
<!ELEMENT      UPDATETYPE (#PCDATA)>
<!ELEMENT      SEVERITY (#PCDATA)>
]>
```

In a representative embodiment of the present invention, if an update package comprises several update packages, a list of such update packages may be made available. For example, a representative embodiment of the present invention may parse a UPC, either employing a simple API for XML (SAX) parser or a document object model (DOM) parser, to retrieve the names and other details of each of the update packages available in a catalog and display it as a list. In one representative embodiment according to the present invention, a SAX parser based paring code may retrieve the names of all available update packages in a given UPC, and an extensible style sheet language (XSL) document (i.e., style sheet) may be used to transform the retrieved information into a list structure for easy viewing and browsing.

In a representative embodiment in accordance with the present invention, a format based on XML for the UPC may be selected, wherein a list of update package names, and even metadata, is placed at the beginning of an XML file. The actual update packages may be placed towards the end of an XML file, with association or mapping between individual update package names and their update package data being possible based on tag names that may be unique, attributes of tags, or other type of identifications/associations.

The following is an exemplary DTD that provides for recursive definition of a TRANSITION element. The TRANSITION element in a representative embodiment of the present invention may be used to encapsulate an update package. An UPDATEPACKAGE may comprise a signature, which may be a digital signature, a CRC, and MD5 checksum, etc.

A DEVICE element may be used to encapsulate one or more TARGET elements, wherein one instance of TARGET can be 'firmware' and another instance can be 'os', etc. A VENDOR element may provide a placeholder for vendor specific information including, for example, vendor names, vendor details, and vendor specific parameters. In addition, a DEPLOYMENT element may specify 'operator' deployments, 'OEM' deployments, etc.

```
<!DOCTYPE UPDATEPACKAGECONTAINER PUBLIC
[
<!-- ============================================================ -->
<!-- THE UPDATEPACKAGECONTAINER W3C SIGNATURES-->
<!-- ============================================================ -->
<!ELEMENT      UPDATEPACKAGECONTAINER (DESCRIPTION, DEVICE+,
SIGNATURETYPE, SIGNATURE) >
<! ELEMENT     DEVICE (DESCRIPTION, MANUFACTURER, MODEL,
DEPLOYMENT,TARGET+) >
<!ELEMENT      TARGET (TRANSITION+) >
<!ATTLIST      TARGET name CDATA #REQUIRED>
<!ELEMENT      MANUFACTURER (#PCDATA) >
<!ELEMENT      MODEL (#PCDATA) >
<!ELEMENT      DEPLOYMENT (#CDATA) >
<!ELEMENT      TRANSITION (ORIGINAL VERSION, UPDATEDVERSION,
UPDATEPACKAGE) >
```

-continued

```
<!ELEMENT      ORIGINAL VERSION (#PCDATA) >
<!ELEMENT      UPDATEDVERSION (#PCDATA) >
<!ELEMENT      UPDATEPACKAGE (NAME, DESCRIPTION, VENDOR*,
               PARAMETERS*,
               CREATIONDATE, SIZE, Signature,
               DOWNLOADTIME, REFLASHTIME,
               DATATYPE, (DATA | PACKAGE | REFERENCE),
               UPDATETYPE, SEVERITY) >
<!ELEMENT      PACKAGE (DATA) >
<!ELEMENT      REFERENCE (#CDATA)>
<!ELEMENT      NAME (#PCDATA) >
<!ELEMENT      DESCRIPTION (#CDATA) >
<!ELEMENT      VENDOR (VENDORNAME, VENDORDETAILS,
PARAMETERS* ) >
<!ELEMENT      VENDORNAME (#CDATA) >
<!ELEMENT      VENDORDETAILS (#CDATA) >
<!ELEMENT      PARAMETERS (PARAMETER*) >
<!ELEMENT      PARAMETER (PARAMETERNAME, PARAMETERVALUE) >
<!ELEMENT      PARAMETERNAME (#CDATA) >
<!ELEMENT      PARAMETERVALUE (#PCDATA) >
<!ELEMENT      CREATIONDATE (#PCDATA) >
<!ELEMENT      SIZE (#PCDATA)>
<!ELEMENT      DOWNLOADTIME (#PCDATA)>
<!ELEMENT      REFLASHTIME (#PCDATA)>
<!ELEMENT      DATATYPE (#PCDATA)>
<!ELEMENT      DATA (#PCDATA)>
<!ELEMENT      UPDATETYPE (#PCDATA)>
<!ELEMENT      SEVERITY (#PCDATA)>
]>
```

An exemplary update package is shown below, with a signature field that references http://www.w3.org/2000/09/xmldsig# definitions of digital signatures.

```
<UPDATEPACKAGE>
    <NAME>                        </NAME>
    <DESCRIPTION>                 </DESCRIPTION>
    <CREATIONDATE>                </CREATIONDATE>
    <SIZE>                        </SIZE>
    <DOWNLOADTIME>                </DOWNLOADTIME>
    <REFLASHTIME>                 </REFLASHTIME>
    <DATATYPE>                    </DATATYPE>
    <REFERENCE>
        URL of Update Package specified here
    </ REFERENCE>
    <SEVERITY>                    </SEVERITY>
</UPDATEPACKAGE>
<UPDATETYPE>                      </UPDATETYPE>
<Signature Id="MyFirstSignature"
xmlns=http://www.w3.org/2000/09/xmldsig# >
</Signature>
```

Figure 4:
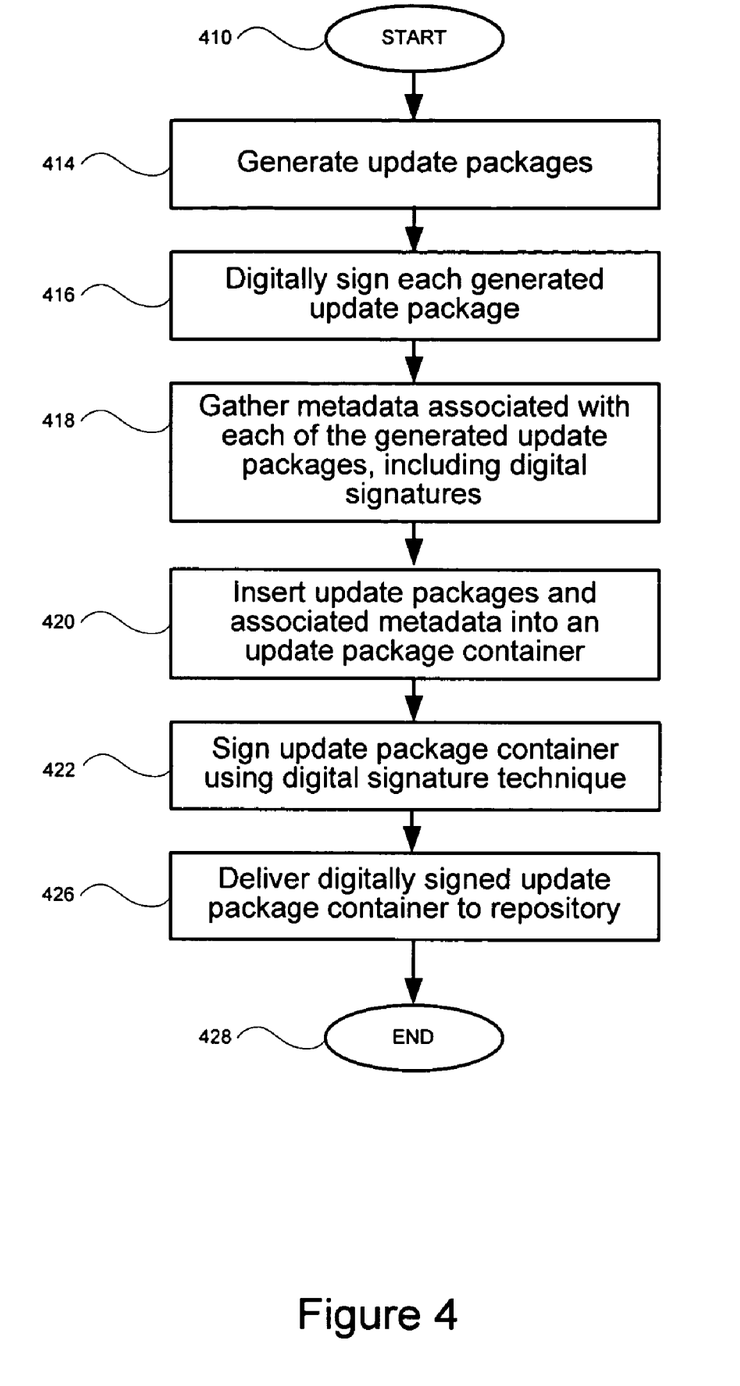
FIG. 4 is a flowchart illustrating an exemplary method of creating an update package container such as, for example, the update package container shown in FIG. 3, in accordance with a representative embodiment of the present invention.

FIG. 4 is a flowchart illustrating an exemplary method of creating an update package container such as, for example, the update package container 300 shown in FIG. 3, in accordance with a representative embodiment of the present invention. The method of FIG. 3 begins at a start block 410. Update packages for updating firmware and/or software for a number of electronic devices may be generated (block 414) for eventual delivery to the respective electronic devices. Each of the update packages may comprise, for example, a set of executable instructions for converting a first version of firmware/software to a second version of firmware/software, and associated data. Metadata associated with each of the update packages may then be gathered, including any digital signatures associated with the update packages (block 418). Metadata associated with an update package may comprise, for example, a size, a name, a model, a make, a signature type, as described above. The update packages and the associated metadata may then be inserted into an update package container (block 420). An example of one representative update package container in accordance with the present invention is shown in FIG. 3. The assembled update package container may then be digitally signed using, for example, a message digest such as MD5, a cyclic redundancy check (CRC), or other form of digital signature (block 422). The assembled and digitally signed update package container may then be delivered to a repository for storage and/or distribution of the update packages contained therein to the respective electronic devices (block 426). The method of FIG. 4 then ends (block 428).

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating updating information for a plurality of mobile electronic devices, the method comprising:
   storing in memory, contents of an update package container comprising plural device update information blocks, wherein each device update information block is associated with at least one of the plurality of mobile electronic devices, and wherein the update information blocks include updates from various generation environments that are generated by different information generators;
   associating at least one target information portion with each of the at least one device update information block, each target information portion comprising information identifying a portion of code in the associated mobile electronic device, and at least one transition information portion comprising associated metadata and one of an update package comprising updating information and reference information identifying a location of an update package outside of the update package container;
   transmitting the update package container to a system that processes each device update information block contained therein to distribute to associated ones of the plurality of mobile electronic devices updating information for converting code in the associated mobile electronic device from a first version to a second version; and
   using an extensible markup language to allow the various generation environments to adopt schema wrappers and metadata supported by the update package container to allow efficient storage and distribution of the updates.

2. The method according to claim 1 wherein each of the plurality of mobile electronic devices is identified by device identification information.

3. The method according to claim 2 wherein the device identification information comprises at least one of: a manufacturer identifier, a model identifier, and a version identifier.

4. The method according to claim 1 wherein the associated metadata comprises at least one of a size, a description, a creation date, a download time, a re-flash time, a vendor information, and a digital signature of an update package.

5. The method according to claim 1 wherein the update package container comprises:
   a digital signature of each of the at least one device update information block of the update package container.

6. The method according to claim 1 wherein the reference information identifying the location of an update package outside of the update package container comprises a universal resource locator (URL).

7. The method according to claim 1 wherein the set of all update packages contained within the update package container and the update packages referenced by the update package container comprise difference information generated by a plurality of manufacturers and software vendors.

8. The method according to claim 1 wherein an update package comprises at least one of: software, firmware, a java virtual machine, a game engine, a configuration file, and a system file for one of the plurality of mobile electronic devices.

9. The method according to claim 1 wherein an update package comprises difference information for updating a first version of code to a second version of code.

10. The method according to claim 9 wherein the difference information comprises a set of executable instructions for converting the first version of code to the second version of code.

11. A system for distributing update packages to a plurality of mobile electronic devices, the system comprising:
   at least one server that acts as an update package repository that stores a plurality of update packages for each of the plurality of mobile electronic devices;
   wherein the at least one server receives a plurality of update package containers each comprising one or more device update information blocks each comprising one or more of a reference to an update package and an update package with associated metadata, from each of a plurality of update package container sources to which the system is communicatively coupled;
   wherein the at least one server processes the received update package containers to store the update packages and associated metadata contained in the plurality of update package containers in the update package repository;
   wherein the update information blocks include updates from various generation environments that are generated by different information generators; and
   wherein an extensible markup language is used to allow the various generation environments to adopt schema wrappers and metadata supported by the update package container to allow efficient storage and distribution of the updates.

12. The system according to claim 11 wherein at least one of the plurality of update package container sources comprises a generator of update packages.

13. The system according to claim 11 wherein the plurality of update package container sources comprises a plurality of generators, each of the plurality of generators having an associated data type definition and managed by an associated one of a plurality of manufacturers of the plurality of mobile electronic devices.

14. The system according to claim 13 wherein the plurality of generators employ the same data type definition.

15. The system according to claim 11 wherein the system comprises a wireless network and wherein at least a portion of the plurality of update package container sources are located remote from the update package repository.

16. The system according to claim 11 wherein the update package repository receives update package containers from the plurality of update package container sources and verifies authenticity of update package containers before further processing of update package containers.

17. The system according to claim 11 wherein the update package repository receives update package containers from the plurality of update package container sources and verifies authenticity of update package containers and update packages contained therein before disseminating the update packages.

18. The system according to claim 11 wherein an update package comprises difference information for updating a first version of code to a second version of code.

19. The system according to claim 18 wherein the difference information comprises a set of executable instructions for converting the first version of code to the second version of code.

20. A method of communicating a plurality of update packages from a generator to a repository using an update package container, each of the plurality of update packages associated with a mobile electronic device, the method comprising:

generating the plurality of update packages, wherein the update packages include updates from various generation environments that are generated by different information generators;

digitally signing the plurality of update packages;

gathering metadata associated with the plurality of update packages, the metadata comprising digital signatures for the plurality of update packages;

inserting the plurality of update packages and associated metadata into the update package container;

signing the update package container using digital signing techniques;

delivering the digitally signed update package container to the repository; and using an extensible markup language to allow the various generation environments to adopt schema wrappers and the metadata supported by the update package container to allow efficient storage and distribution of the updates.

21. The method according to claim 20 wherein inserting comprises:

arranging the plurality of update packages according to at least one of a manufacturer type, a model, a target, and a transition of the associated mobile electronic device.

22. The method according to claim 20 wherein signing the update package container comprises:

computing a World Wide Web Consortium (W3C)-based digital signature; and inserting the W3C-based digital signature into the update package container.

23. The method according to claim 22 wherein inserting comprises:

incorporating update packages generated for at least one of a firmware, a software, a configuration, and a data.

24. The method according to claim 22 wherein delivering comprises:

establishing secure communication between the generator and the repository; and depositing the update package container in the repository for processing and storage.

* * * * *